United States Patent [19]

Heyring

[11] Patent Number: 5,480,188

[45] Date of Patent: Jan. 2, 1996

[54] VEHICLE SUSPENSION SYSTEM

[75] Inventor: Christopher B. Heyring, Dunsborough, Australia

[73] Assignee: Kinetic Limited, Australia

[21] Appl. No.: 170,296

[22] PCT Filed: Jul. 2, 1992

[86] PCT No.: PCT/AU92/00324

§ 371 Date: Dec. 30, 1993

§ 102(e) Date: Dec. 30, 1993

[87] PCT Pub. No.: WO93/01063

PCT Pub. Date: Jan. 21, 1993

[30] Foreign Application Priority Data

Jul. 2, 1991 [AU] Australia .................. PK 6974

[51] Int. Cl.$^6$ .................................................. B62D 9/02
[52] U.S. Cl. ............................................. 280/772; 280/6.11
[58] Field of Search .................................. 280/772, 6.11, 280/703, 704, 6.1, DIG. 1; 180/41

[56] References Cited

U.S. PATENT DOCUMENTS

| | | | |
|---|---|---|---|
| 3,334,913 | 8/1967 | Margala | 280/8.16 |
| 4,593,920 | 6/1986 | Natsume et al. | 280/6.1 |
| 4,606,551 | 8/1986 | Toti et al. | 280/772 |
| 4,943,084 | 7/1990 | Fakunaga et al. | 280/203 X |
| 5,066,041 | 11/1991 | Kuidermann et al. | 280/772 |
| 5,161,822 | 11/1992 | Lund | 280/772 |

FOREIGN PATENT DOCUMENTS

| | | |
|---|---|---|
| 1006945 | 4/1952 | France . |
| 1535641 | 7/1968 | France . |
| 1918393 | 2/1971 | Germany . |
| 2135633 | 2/1973 | Germany . |
| 3410856 | 2/1985 | Germany . |
| 670361 | 4/1952 | United Kingdom . |
| 1488254 | 10/1977 | United Kingdom . |
| 2160830 | 1/1986 | United Kingdom . |
| 9301948 | 2/1993 | WIPO ................... 280/6.11 |

Primary Examiner—Margaret A. Focarino
Assistant Examiner—Christopher Ellis
Attorney, Agent, or Firm—Birch, Stewart, Kolasch & Birch

[57] ABSTRACT

A vehicle having a load support body, and a pair of front ground engaging wheels and a pair of rear ground engaging wheels connected to the body to support the body is shown, with each wheel being displaceable relative to the body in a generally vertical direction. A double acting fluid ram has a piston and is interconnected between each wheel and the body. Each ram includes a first and second fluid filled chamber on opposite sides of the ram piston, with the first and second chambers varying in volume in response to vertical movement between the respective wheel and the body. First conduits provide fluid communication between the first chambers of the front and rear rams on the same side of the vehicle, and second fluid conduits provide communication between the second chambers of the front and rear rams on the same side of the vehicle. A first further fluid communicating conduit interconnects the first fluid conduit on each side of the vehicle to the respective second fluid conduit on the opposite side of the vehicle, to thereby provide two fluid circuits, each including one of the first conduits, one of the second conduits, and one of the first further conduits interconnecting the first and second conduits. Each circuit is adapted to resiliently vary the fluid capacity of the circuit by an accumulator to accommodate fluid displaced from rams in that circuit with a resultant pressure rise in the circuit.

20 Claims, 4 Drawing Sheets

VEHICLE SUSPENSION SYSTEM

This invention relates to a suspension system for a vehicle, and is specifically related to controlling the movement of the wheels relative to the vehicle body when traversing uneven surfaces and while turning at speed.

BACKGROUND OF THE INVENTION

In known suspension systems resilient means such as springs or torsion bars are provided to perform a multiplicity of functions ranging from the absorption of impact loading (as from hitting bumps at speed) to the provision of flexible support to enable all the wheels to maintain ground contact when traversing uneven terrain. Additionally applied loads such as cargo deflects traditional suspensions to induce movement between the body and wheels in a similar manner to dynamic or contour loadings.

Traditionally resilient sprung suspensions are based on each wheel assembly being provided with an individual resilient component which mechanically supports the respective "corners" of the vehicle. The resilient components have rapidly progressive load rating as deflected and normal vehicle weight is only distributed to all wheels when wheels collectively describe a flat plane surface. When one wheel of a vehicle passes over (or is parked on) a bump, that wheel carries more vehicular weight than it normally carries on flat ground. Meanwhile the adjacent wheels are correspondingly relieved of some of their normal share of the weight.

The rapidly progressive resilient sprung suspension systems work satisfactorily only within a narrow spectrum of dynamic, static and applied loading situations, and any type of overloading or even underloading of a vehicle normally adversely affects its abilities to maintain traction, average ground clearance, and quality of ride. Moreover the scope of demands upon known resilient suspension systems lead to self conflicting performance characteristics as there is no inherent ability in the system to detect and react differently to diverse situations, which cause resonant rebounding, requiring excessive damping with shock absorbers, and also anti-roll bars, thus limiting free movement of unsprung components.

Recently there has been a trend towards resilient sprung suspension systems incorporating variable damping and spring rates in an attempt to redress some of the above referred to shortcomings. Some other more advanced suspension systems (active and semi-active suspensions) incorporate a number of electronic sensors which monitor information such as vertical wheel travel and body roll, as well as speed, acceleration, steering and braking commands. This and other data is processed by a computer which instructs hydraulic or pneumatic actuators to override the normal function of resilient springs in order to interpret, compensate and adjust the suspensions performance to suit speed, terrain and other factors in order to maintain a level ride and even distribution of weight onto wheels. These suspension systems therefore require an external intelligent back-up system, and call for substantial input of external energy, drawn from the vehicle engine, to operate the actuators that affect the adjustment to the suspension system. A range of constructions of 'active' and 'semi-active' suspensions for vehicles have been proposed including systems operating on the basis of compression and/or displacement of fluids and such systems currently in use incorporate a pump to maintain the working fluid at the required pressure and effect the high speed distribution thereof, and sophisticated control mechanisms to regulate the operation of the suspension system in accordance with sensed road and/or vehicle operating conditions. These known systems incorporating pumps and electronic control systems, are comparatively expensive to construct and maintain, and require energy input, and therefore have limited acceptability in the vehicle industry.

There has been proposed, such as in U.S. Pat. No. 4,606,551, damping systems used in conjunction with conventional sprung suspensions wherein fluid damping devices associated with individual wheels are interconnected to provide additional damping action during lateral rolling or longitudinal pitching movements. Although these constructions may contribute to improve damping performance the desirable characteristics of the basic sprung suspension, of rapidly progressive change in spring forces, lead to undesirable changes in weight distribution and limited wheel movement are still present.

SUMMARY OF THE INVENTION

It is therefore the object of the present invention to provide a suspension system which eliminates the use of conventional spring components and incorporates a totally fluid suspension without the need of controlled external energy input during operation, and which provides unrestricted axle articulation while minimising roll and pitch motion and is of relative simple construction and effective in operation.

With this object in view, there is provided a vehicle having a load support body, and a pair of front ground engaging wheels and a pair of rear ground engaging wheels connected to the body to support the body, each wheel being displaceable relative to the body in a generally vertical direction. Double acting fluid rams each having a piston are interconnected between each wheel and the body. Each ram includes a first and a second fluid filled chamber on opposite sides of the piston. The first and second chambers will vary in volume in response to vertical movement between the respective wheel and the body. A first fluid communicating conduits is provided connecting the first chambers of the front and rear rams on the same side of the vehicle, and second fluid communicating conduits connect the second chambers of the front and rear rams on the same side of the vehicle. There is also provided a first further fluid communicating conduit interconnecting the first fluid conduit on each side of the vehicle to the respective second fluid conduit on the opposite side of the vehicle.

There is thus provided two fluid circuits each comprising one of said first conduits one of said second conduits and one of said first further conduits interconnecting the first and second conduits. These circuit are each adapted to resiliently vary the fluid capacity of the circuit to accommodate fluid displaced from rams in that circuit by a resultant pressure rise in the circuit to thereby provide substantially constant loading on the respective wheels irrespective of the vertical position of the wheels relative to the body while minimizing the roll movement in the lateral direction.

In a preferred form, at least one pair of wheels selected from the front and rear pairs of wheels of the vehicle are connected to the body by respective additional rams each defining a third fluid chamber. The third fluid chambers are interconnected by a third conduit to provide a third fluid circuit. The first, second and third fluid circuits in operation are independent of external fluid and pressure sources.

Figure 1:
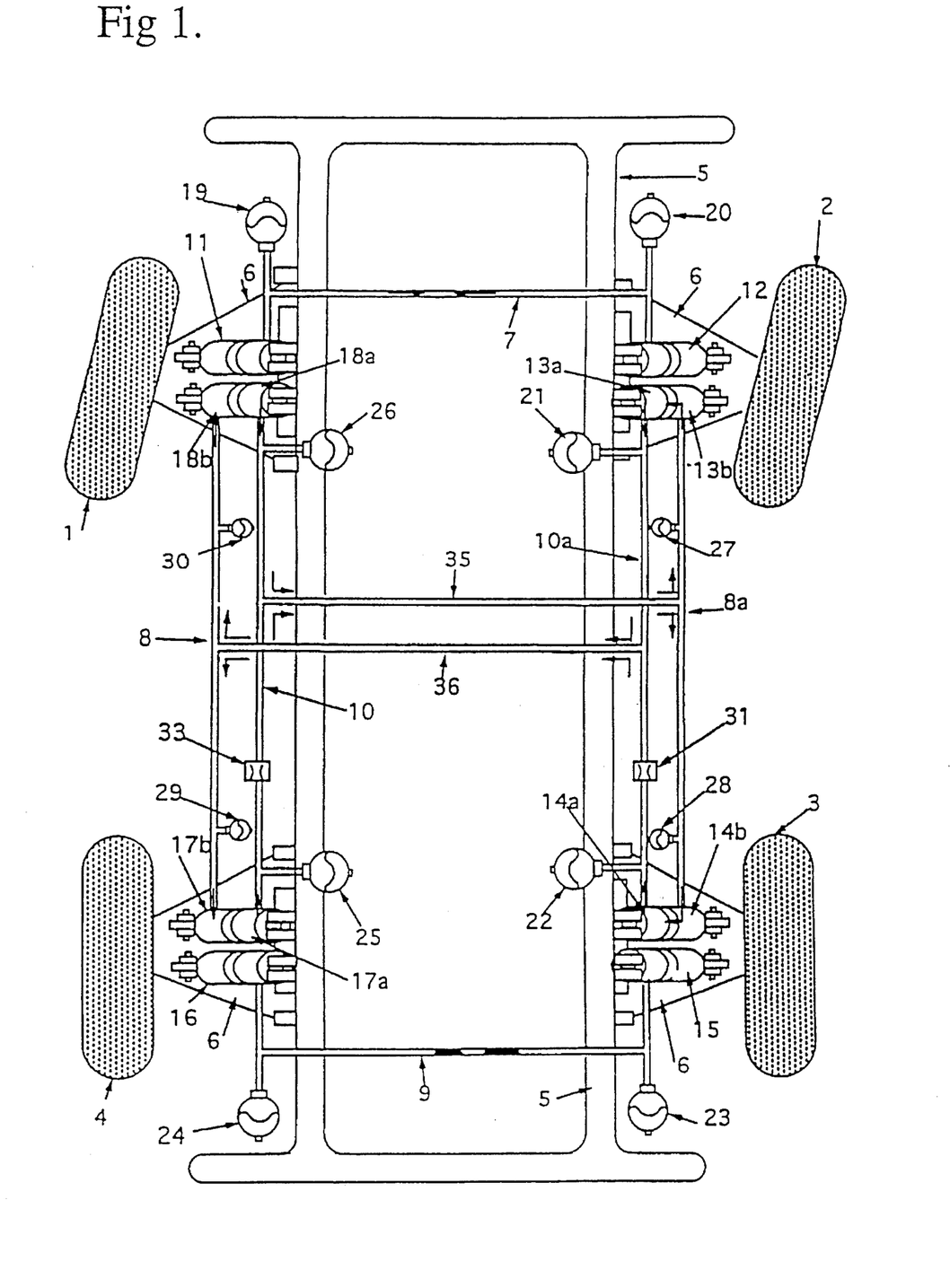
FIG. 1 is a diagrammatic layout of a vehicle chassis and wheel assembly incorporating the proposed suspension system.

The interaction of the rams on the opposite sides of the vehicle by the two independent fluid circuits provide a control over the lateral roll of the vehicle body, as normally encountered when the vehicle is turning, particularly at speed. It will be understood that when the vehicle, such as that referred to hereinafter and as seen in FIG. 1 is turning to the right centrifugal forces generate that tend to lower the left side of the vehicle and thereby increase the pressure in the first chambers and therefore the first conduit on the left side of the vehicle, while also lifting the right side of the vehicle thereby lowering the pressure in the first chambers on the right side. As the left first conduit is connected to the right second conduit, fluid will be displaced from the left first chambers via the first conduit to the right second conduit into the second chambers on the right, to balance the pressures therein and thereby maintain a substantially level altitude of the vehicle.

In a preferred form the vehicle has a second double acting ram connected between each wheel and the vehicle body with third and fourth conduits connecting the second double acting ram on opposite ends of the vehicle at both the front and rear of the body respectively. Also the third and fourth conduits at the front are cross interconnected to third and fourth conduits at the rear in the same manner as previously described with respect to the first and second circuits on either side of the body. That is the front third conduit is connected to the fourth rear conduit while the fourth front conduit is connected to the third rear conduit. The second double acting cylinders interconnected in this manner function to control fore and aft pitching of the vehicle as normally arises during braking or acceleration.

The transference of the fluid medium at balancing pressures and volumes effects immediate levelling and stabilisation of the vehicle by the extension and retraction of the appropriate rams which provide the changing adjustable support mechanism of the vehicle body with reference to the unsprung wheel assemblies.

In order to accommodate the displacement of fluid from the rams incorporated in each circuit, there is preferably provided at least one pressure accumulator in each circuit. More specifically there is preferably at least one pressure accumulator in each first and the third conduit connecting the respective first chambers on either side of the vehicle and the third transverse chambers. The accumulators provide resilience in the suspension system as springs do in conventional suspensions. In an embodiment of the suspension where the fluid is compressible, accumulators are not required as the medium itself acts as an accumulator.

When the vehicle is travelling on normal roadways wheel movements relative to the body are small and normally of high frequency and are accommodated by displaced fluid into an accumulator in the relevant circuit with little if any transfer of fluid between cylinders, but with an increase in the pressure in that circuit.

However when the vehicle is off normal roadways and/or when pitch or roll creating conditions exist, larger and relative low frequency wheel movements are experienced and these are initially accommodated by some fluid passing to the accumulator with a resultant pressure rise in the circuit and some passing to other rams in the circuit to induce compensating movement of other wheels of the vehicle. The interaction of pressures and volumes within the circuits continuously produces new stable conditions in respect to the vertical position of the wheels relative to the body with substantially even weight distribution to all wheels. The body generally adopts a horizontal or parallel attitude to the overall inclination of the terrain.

Unlike other systems, roll and pitch minimisation and the reestablishment of body level is achieved in the presently proposed construction without compromising ride comforts and without the input of energy into the suspension system drawn from pump, compressor or otherwise from an engine or external power source, and without the necessary requirement of pressure transducers and other performance monitoring devices feeding information to one or more of ECUs which in turn may control electrical solenoid valves, pumps, compressors or the controlled release of pressurised fluid from accumulators.

The vehicle suspension above described differs from all known systems in that the wheel travel is not controlled entirely by progressive resilient suspension mechanisms and all wheels can freely follow extremely uneven terrain without significant change to the normal weight distribution to all wheels, while also maintaining a substantially level roll and pitch attitude without limiting the permissible extent of wheel travel movements.

A vehicle supported on wheels in the above described manner allows free vertical travel of the individual wheels with respect to the vehicle body without having to first overcome the resistance of the conventional spring mechanisms normally incorporated between the wheels and the vehicle body. Thus, the wheels are free to move to follow the undulations of the surface being travelled without continually changing the vehicle weight distribution between the individual wheels. This substantial elimination of changes in weight distribution, significantly improves the traction of the wheels to the surface being transverse and the handling characteristics of the vehicle.

BRIEF DESCRIPTION OF THE DRAWINGS

Several practical applications of the present invention will now be described by way of examples with reference to the accompanying drawings.

In the drawings

DESCRIPTION OF THE PREFERRED EMBODIMENT

Referring now to FIG. 1 of the drawings, the vehicle chassis 5 is supported by the four wheels 1 to 4 respectively through parallel wishbone type linkage 6, the construction of which is well known. Other forms of linkage for connecting the vehicle wheels to the chassis could be used if preferred. It is however to be noted that no springs, torsion bars, or other resilient suspension elements need be interposed between the chassis and the respective wheels.

Double acting rams are interconnected between the chassis and the linkage 6 connecting each wheel to the chassis. The front and rear rams on the wheels on the left side in FIG. 1 are numbered 18 and 17 and on the right side 14 and 13 respectively. Each of the rams have a cylinder coupled to the chassis 5 and a piston therein dividing the cylinder into two chambers indicated as 17a and 17b in respect of cylinder 17 and 18a and 18b in respect to ram 18. The other two cylinders 13 and 14 are of the same construction and similarly identified. The piston of each ram is connected to the respective wheel through the linkage 6 so the piston will reciprocate in the cylinder as the wheel is moved in the general vertical direction relative to the chassis 5.

Figure 2:
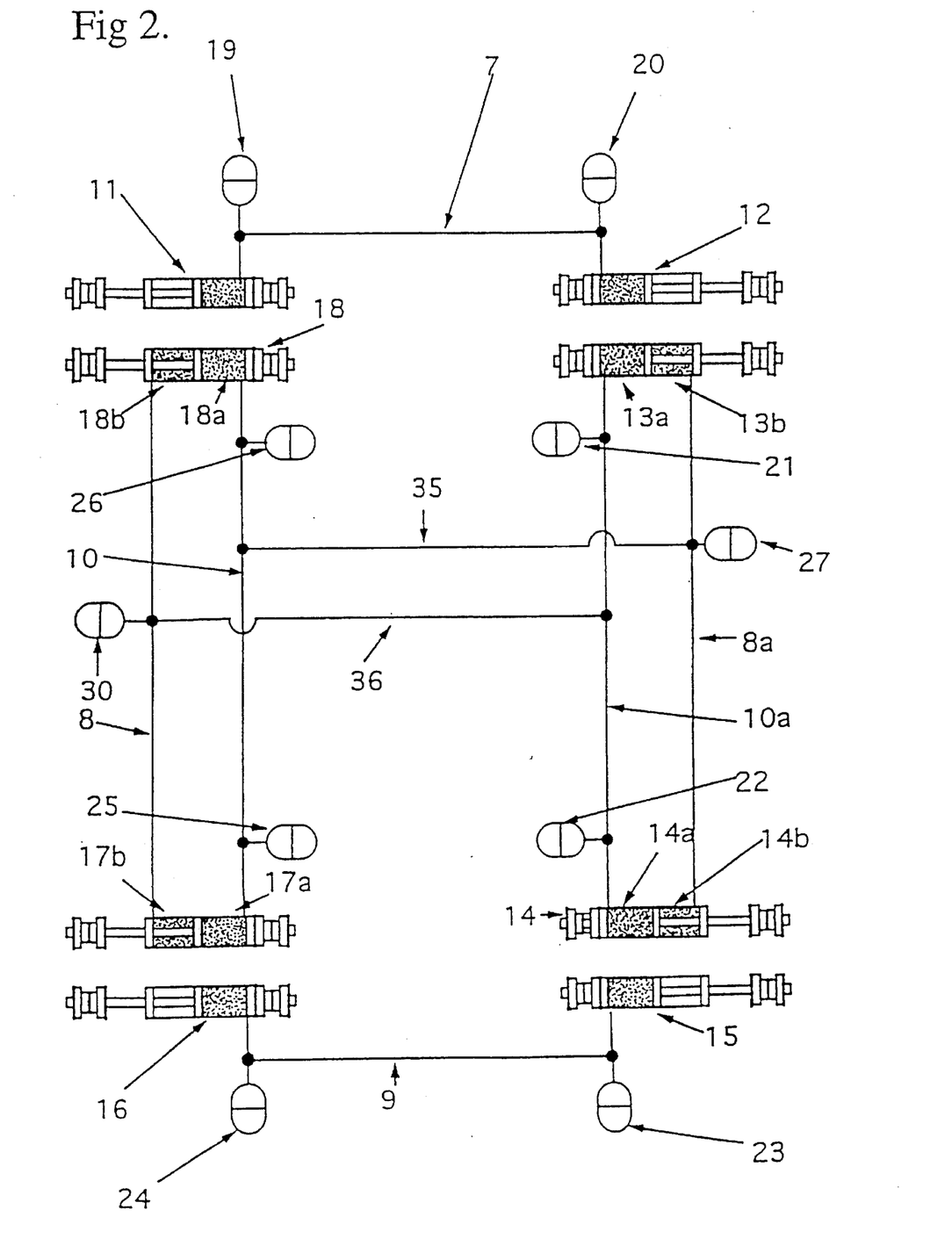
FIG. 2 is a fluid circuit diagram of the suspension system shown in FIG. 1.

Referring now to FIG. 1 and 2, rams 17 and 18 on the left side of the vehicle, have the two upper chambers 17a and 18a in communication by the conduit 10 and lower chambers 17b and 18b in communication by the conduit 8. Similarly the upper chambers of the rams 13 and 14 on the right side are in communication by a conduit 10a and the lower chambers by a conduit 8a. Intermediate the length thereof the conduit 10 is in communication with conduit 8a by conduit 35 and conduits 10a and 8 by conduit 36 to provide respective circuits.

In addition a single acting ram is provided in association with each wheel and is connected between the chassis 5 and the linkage 6 support the wheel in a like manner to the double acting rams previously referred to. The single acting rams at the front of the chassis being numbered 11 and 12 and at the rear 15 and 16. The chambers of the front single acting rams 11 and 12 are in communication with each other by conduit 7 and the chambers of the rams 15 and 16 are in communication by conduit 9.

It is to be understood that it is not essential to provide the additional single acting cylinders at both the front and the rear of the chassis, and if only one end is fitted it is preferably installed at the end of the chassis which is generally heavier.

The circuits 10 and 10a connected to the upper chambers of the four double acting rams, each has two accumulators 25 and 26 and 21 and 22 in communication therewith, and are primarily responsible for providing resilience in the suspension as do springs in prior art sprung suspensions. If the fluid used in the rams and connecting conduits is a compressible gas, accumulators are not required as the gas provides the required level of compressibility or resilience.

Additional optional accumulators may be provided such as 27, 28 and 29, 30 on conduits 8 and 8a respectively as shown in FIG. 1. These accumulators, when provided are preferably smaller and matched in size and function to the lower chambers of the rams allowing the fluid in the lower chambers to be expelled quickly and provide resistance to shock loading where the axles may be thrust down and could damage the pistons and their housings. The accumulators also enable faster reactions and responses of ram movements as frictional losses are minimised in the conduits.

Further accumulators 19, 20 are in communication with the front circuit 7, and 23 and 24 in the rear circuit 9.

All accumulators preferably are located as near as practicable to their associated rams to provide an immediate and accurate response to fast dynamic forces arising when the vehicle is travelling fast.

When the above described suspension is fitted to normally slow moving vehicles, such as cranes, it is appropriate to incorporate only a single accumulator in each circuit, and in extra load bearing circuits the accumulators may be omitted or be provided with an isolating means, such as a solenoid valve, to reduce the resilience of these particular circuits when under load. Additionally and conversely there may be multiple accumulators in any circuit and each accumulator may be recharged to a different pressure to provide a progressive variety of spring rates to suit different loading situations.

The accumulators may be provided with damping valves in the mouths thereof to perform the same function as so called shock absorbers in other vehicles' suspension systems.

Flow control devices such as 31 and 33 may be provided in any circuit to reduce the speed and control the passage of the fluid flow to ensure that the rams at either end of the conduits communicate directly only at slow speed, as arises when the vehicle traverses rough ground requiring large wheel travel motions (or axle articulations) and optimum low ground pressure on all wheels. At high speeds the small dynamic wheel travel motions and vibrations are best resolved primarily by the accumulators.

Any of the conduits may be provided with flow control devices or other means to vary and even stop the flow along the conduits between the relevant rams. An example of such a valve may be a solenoid valve which is activated by an ECU Which processes a variety of information received from sources such as accelerometers or pressure transducers and thereby cause the sudden or gradual closure of the valves.

Figure 3:
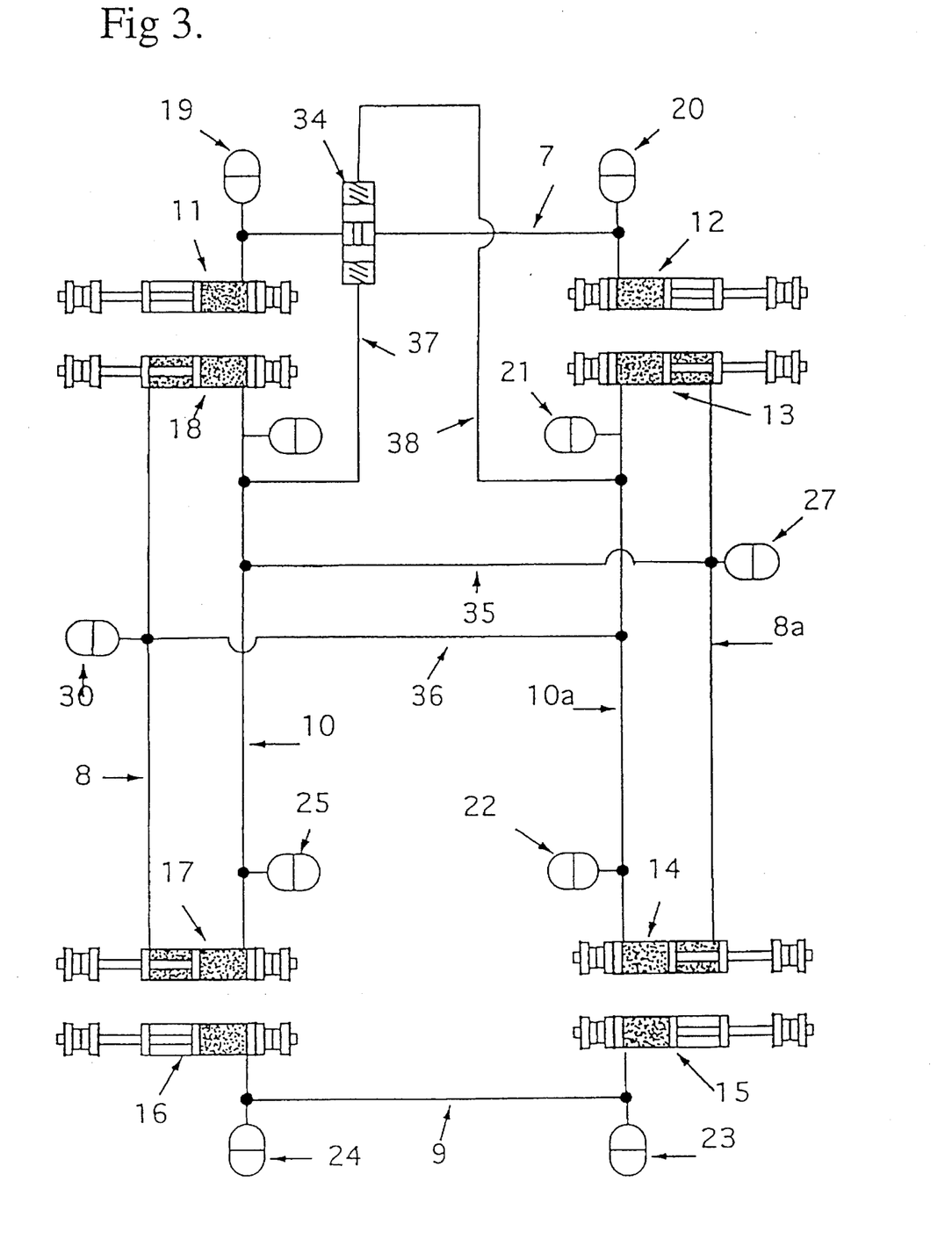
FIG. 3 is a fluid circuit diagram of a first modification of the suspension.

In the preferred construction a spool valve is provided in the circuit 7 as indicated at 34 in FIG. 3. It will be seen that the valve 34 is centrally located within a housing so as to allow free and unimpeded passage of fluid there through when the pressure on either end of the valve is equal. However, if a pressure differential develops the valve is caused to be displaced and will block the passage of fluid in the conduit 7. In the particular valve as illustrated the opposite end faces of the spool are connected by conduits 37 and 38 to the circuits 10 and 10a respectively so that a pressure differential between circuits 10 and 10a, resulting from eccentric loading or cornering of the vehicle, will close spool valve 34, thus preventing the flow of fluid between rams 11 and 12 which would if permitted exaggerate roll motions of the body. The spool valve can be constructed or set so as a predetermined pressure differential is required to effect closure of the spool valve 34.

The operation of the suspension system as illustrated in FIGS. 1 and 2 will now be described in detail. In the following description it is to be understood that, due to the accumulators incorporated in the circuits, fluid displaced by a ram resulting in a change of wheel loading will be taken up by the accumulator resulting in a pressure increase and partly transferred to the other rams in the same circuit.

When the vehicle is turning towards the right, as indicated in FIG. 1, centrifugal force causes a shift in weight distribution to the left, thereby transferring the majority of weight onto the left wheels 1 and 4 via the left side rams 11, 18, 17 and 16 which additionally compress the chambers 11a, 18a, 17a and 16a and thereby shorten overall length of those rams while the rams 13, 14, 12 and 15 on the right side of the vehicle are relieved of the corresponding vehicle weight and therefore become extended.

When cornering on a flat surface, without applying brakes or accelerating, it is assumed that there is similar centrifugal forces applied on both front and rear left rams on the same side of the vehicle and therefore act equally and oppositely upon each other.

The sum of the pressure increase of the two upper chambers 17a and 18a in circuit 10 (left side) seeks to relieve itself by the transmission of fluid to the lesser pressurised right side of the vehicle along conduit 35 and hence to the two lower chambers 13b and 14b of rams 13 and 14. This results in chambers 13b and 14b attempting to enlarge in volume thereby foreshortening the total length of rams 13 and 14, thus reducing the overall height of the body on the lesser loaded side (right side).

It is to be noted that the rams are of typical double acting hydraulic/pneumatic cylinders' construction in that the pistons thereof present different areas on the upper and lower piston surfaces due to the rod reducing the face area of the lower chambers. This will result in the greater force being developed on the greater upper face area of the piston which thereby supports the vehicle. The relative surface areas of the piston faces within the cylinder determine the amount of roll (or pitch) which is permitted to take place in order to maintain a safe 'feel' or feedback to the driver.

The function of the mirror image components and chambers on the other side of the vehicle work to support and contribute to the controlled reduction of roll as follows;

During cornering to the right as the chambers 13a and 14a are being urged to enlarge as the pistons are being drawn down resulting in a combined pressure reduction which is communicated by conduits 36 and 8 to chambers 18b and 17b which as a result attempt to shrink in volume thereby assisting the control of roll motion by effectively helping to enlarge chambers 18a and 17a thereby providing additional support on the left side of the system and vehicle.

It must be noted that while the above described roll control procedure limits the combined positions of the wheels 1, 4 and 2, 3 respectively it does not prevent any free reciprocal movements of adjacent wheels when simultaneously traversing and contouring to uneven ground.

The above description of transverse interconnections between the left and right circuits applies similarly to like interconnected circuits between the front and rear wheels to control pitch motions in a similar manner. The circuit arrangement to achieve this is illustrated in FIG. 4 which is a development of the circuit shown in FIG. 2.

Figure 4:
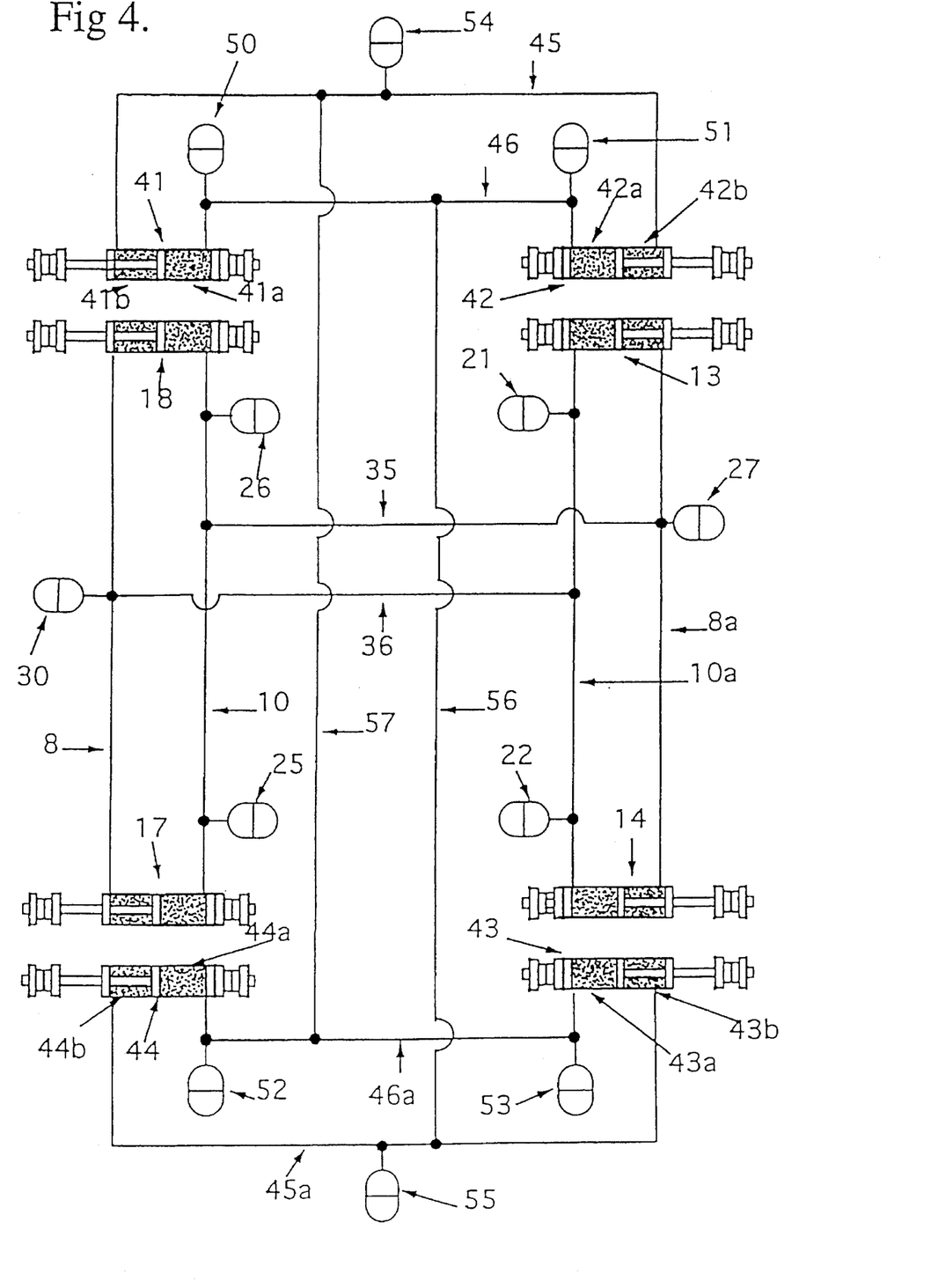
FIG. 4 is a fluid circuit diagram of a second modification of the suspension system.

In FIG. 4 elements corresponding to and operating as previously described with reference to FIG. 1 and FIG. 2 are numbered in the same manner and shall not be further described in detail with respect to FIG. 4.

In the embodiment illustrated in FIG. 4 the single acting rams 11, 12, 15 and 16 have been replaced by double acting rams 41, 42, 43 and 44 each having upper and lower chambers. The upper chambers are numbered 41a, 42a, 43a and 44a and the lower chambers 41b, 42b, 43b and 44b. The rams 41 and 42 at the front of the vehicle have upper chambers 41a and 42a interconnected by conduit 46 and the lower chambers 41b and 42b are interconnected by conduit 45. Similarly rams 43 and 44 at the rear of the vehicle have the upper chambers 43a and 44a inter connected by conduit 46a and the lower chambers 43b and 44b interconnected by conduit 45a.

The conduits 46 and 46a each have two accumulators 50, 51 and 52, 53 in communication therewith, each accumulator being in close proximity to the respective rams interconnected by the respective conduits. The conduits 45 and 45a each have a single accumulator 54 and 55. This distribution of the accumulators is similar to that previously described with reference to FIGS. 1 and 2 and is used for the same reason as previously explained except for in the pitch direction.

It is to be noted that spool valve 34 previously described with reference to FIG. 3 is not appropriate in the fuller suspension system illustrated in FIG. 4. The conduits 45 and 46a are interconnected by conduit 57 to provide a circuit and conduits 45a and 46 are interconnected by conduit 56 to also provide a circuit.

The lower chambers of the double acting rams 41, 42, 43 and 44 and their associated circuits incorporating interconnecting conduits control fore and aft pitching motion of the vehicle in the longitudinal direction thereof usually arising from breaking or acceleration of the vehicle. When the vehicle may be for example breaking and cornering simultaneously both longitudinal and transverse circuits would work simultaneously to control both roll and pitch. Axle articulation may also be taking place simultaneously as a result of uneven terrain resulting in reciprocal motions of rams at adjacent wheels and the various functions of the circuits will not interfere with each other to restrict the functions of other circuits.

When circuits normally operate at very different pressures it may be necessary to introduce one or a number of staging devices to change pressure and volume relationships which effectively compensate for biases or unwanted pressure differentials. Normally it is useful to size all cylinders to work at the same pressure to facilitate initial charging and servicing of the systems.

While the accumulators described with reference to the various embodiments commonly incorporate damper valves the pneumatic version of the invention uses the gaseous medium within the volume of the chambers and connecting conduits as the resilient means itself, and the dampers normally incorporated in the accumulators would therefore not be available. It is necessary therefore to provide separate damper units in parallel with the rams. These may be of the common telescopic shock absorber variety or can be incorporated into the rams in a variety of ways.

While accumulators are shown and described as hydropneumatic chambers it is pointed out that cylinders incorporating pistons driving external coil springs or other similar systems may equally be used.

Additionally, it is optionally normal and beneficial to include a pump, compressor, accumulator or other power source to permit the voluntary and periodical raising, levelling and attitude changes in the vehicle that may be required or may become necessary as a result of fluid leakage. Some operators may also require the facility of being able to run their vehicles at different and changeable heights. These variations are not illustrated or described as systems for such purposes are known and can easily be adapted or incorporated into the suspension system herein described.

It should also be pointed out that multiple axle vehicles can utilise variations of this invention and these too are considered to be within the scope of the invention. Furthermore linked suspension systems which may comprise of only two circuits or more than four circuits may usefully incorporate the technology described and therefore these variations are also included within the scope.

The claims defining the invention are as follows:

1. A vehicle having a load support body, a pair of front ground engaging wheels and a pair of rear ground engaging wheels connected to the body to support the body, each wheel being displaceable relative to the body in a generally vertical direction, a double acting fluid ram having a piston and interconnected between each wheel and the body, each ram including a first and a second fluid filled chamber on opposite sides of the piston, said first and second chambers varying in volume in response to vertical movement between the respective wheel and the body, respective first conduits providing fluid communication between said first chambers of the front and rear rams on the same side of the vehicle, respective second fluid conduits providing communication between the second chambers of the front and rear rams on the same side of the vehicle, a first further fluid communicating conduit interconnecting the first fluid conduit on each side of the vehicle to the respective second fluid conduit on the opposite side of the vehicle, to thereby provide two fluid circuits each comprising one of said first conduits, one of said second conduits, and one of said first further conduits interconnecting the first and second conduits, each said circuit being adapted to resiliently vary the fluid capacity of the circuit to accommodate fluid displaced from rams in that circuit with a resultant pressure rise in the circuit, and at least one pair of wheels selected from the front and rear pairs of wheels of the vehicle being connected to the body by respective additional rams each defining a third fluid chamber, said third fluid chambers being interconnected by a third fluid conduit to provide a third fluid circuit, said first, second and third fluid circuits in operation being independent of external fluid and pressure sources and providing substantially consistent loading on the respective wheels irrespective of vertical position of the wheels while minimizing roll movement in the lateral direction.

2. A vehicle as claimed in claim 1, wherein the other pair of wheels from said front and rear pairs of wheels has each wheel thereof interconnected to the body by respective additional fluid rams having a fluid chamber and said fluid chambers of the additional fluid rams are interconnected by an additional conduit to provide an additional fluid circuit.

3. A vehicle as claimed in claim 2, wherein control means are provided in the additional circuit to vary the permissible fluid flow rate between said rams connected by said additional circuit.

4. A vehicle as claimed in claim 3, wherein the control means is operable in response to the pressure differential between the two first circuits to reduce said fluid flow rate as said pressure differential increases.

5. A vehicle as claimed in claim 2, wherein control means are provided in the third conduit operable in response to a predetermined pressure differential between the two first circuits to terminate the flow in the third circuit.

6. A vehicle as claimed in claim 1, wherein control means are provided in the third conduit operable to vary the permissible fluid flow rate between the rams connected by said third fluid circuit.

7. A vehicle as claimed in claim 6, wherein the control means is operable in response to the pressure differential between the two first circuits to reduce said fluid flow rate as said pressure differential increases.

8. A vehicle as claimed in claim 1, wherein control means are provided in the third conduit operable in response to a predetermined pressure differential between the two first circuits to terminate the flow in the third circuit.

9. A vehicle as claimed in claim 1, wherein each circuit has at least one pressure accumulator in communication therewith.

10. A vehicle as claimed in claim 1 wherein each first conduit has a respective pressure accumulator in communication therewith.

11. A vehicle as claimed in claim 1, wherein each first conduit has two pressure accumulators in communication therewith one located in proximity to each first chamber connected to the respective first conduit.

12. A vehicle as claimed in claim 1, wherein each second conduit has a pressure accumulator in communication therewith.

13. A vehicle as claimed in claim 1, wherein each first conduit has a flow control means therein to control the rate of flow of fluid in either direction therethrough.

14. A vehicle having a load support body, a pair of front ground engaging wheels and a pair of rear ground engaging wheels connected to the body to support the body, each wheel being displaceable relative to the body in a generally vertical direction, a double acting fluid ram having a piston and interconnected between each wheel and the body, each ram including fluid filled first and second chambers on opposite sides of the piston, said first and second chambers varying in volume in response to vertical movement between the respective wheel and the body, respective first fluid communicating conduits connecting said first chambers of the front and rear rams on the same side of the vehicle, respective second fluid communicating conduits connecting the second chambers of the front and rear rams on the same side of the vehicle, a respective first further fluid conduit communicating the first fluid conduit on each side of the vehicle to the respective second fluid conduit on the opposite side of the vehicle, to thereby provide two fluid circuits each comprising respective first and second conduits and the first further conduit interconnecting said first and second conduits, a further double acting ram interconnected between each wheel and the body, each double acting ram having a piston and providing fluid filled first and second chambers on opposite sides of the piston, respective third fluid communicating conduits connecting said first chambers of the further rams of the two front wheels and the two rear wheels, respective fourth fluid communicating conduits connecting the second chambers of the said further rams of the two front wheels and the two rear wheels, and second further fluid communicating conduits interconnecting the respective third fluid conduits of the front and rear wheels of the vehicle to the respective fourth fluid conduits of the front and rear wheels, to thereby provide two further fluid circuits each comprising one of said third conduits, one of said fourth conduits and one of said further conduits interconnecting said third and fourth conduits, each said fluid circuits being adapted to resiliently vary the fluid capacity of the circuit to accommodate fluid displaced from rams in that circuit with a resultant pressure rise in the circuit, said first, second, third and fourth fluid circuits in operation being independent of external fluid and pressure sources and providing substantially consistent wheel loading irrespective of the vertical wheel positions while minimizing roll and pitch movement in the lateral and longitudinal direction respectively.

15. A vehicle as claimed in claim 14, wherein each circuit has at least one pressure accumulator in communication therewith.

16. A vehicle as claimed in claim 14, wherein each first conduit has a respective pressure accumulator in communication therewith.

17. A vehicle as claimed in claim 14, wherein each first conduit has two pressure accumulators in communication therewith, one located in proximity to each first chamber connected to the respective first conduit.

18. A vehicle as claimed in claim 14, wherein each second conduit has a pressure accumulator in communication therewith.

19. A vehicle as claimed in claim 14, wherein each first conduit has a flow control means therein to control the rate of flow of fluid in either direction therethrough.

20. A vehicle having a load support body, a pair of front ground engaging wheels and a pair of rear ground engaging wheels connected to the body to support the body, each wheel being displaceable relative to the body in a generally vertical direction, a double acting fluid ram having a piston and interconnected between each wheel and the body, each ram including a first and a second fluid filled chamber on opposite sides of the piston, said first and second chambers varying in volume in response to vertical movement between the respective wheel and the body, respective first fluid communicating conduits connecting said first chambers of the front and rear rams on the same side of the vehicle, respective second fluid communicating conduits connecting the second chambers of the front and rear rams on the same side of the vehicle, a first further fluid communicating conduit interconnecting the first fluid conduit on each side of the vehicle to the respective second fluid conduit on the opposite side of the vehicle, to thereby provide two fluid circuits each comprising one of said first conduits, one of said second conduits, and one of said first further conduits interconnecting the first and second conduits, each said circuit being adapted to resiliently vary the fluid capacity of the circuit to accommodate fluid displaced from rams in that circuit with a resultant pressure rise in the circuit to provide substantially constant loading on the respective wheels irrespective of the vertical position of the wheels relative to the body while minimizing roll movement in the lateral direction.

* * * * *